United States Patent
Feil et al.

(10) Patent No.: US 8,546,520 B2
(45) Date of Patent: Oct. 1, 2013

(54) METHOD FOR TREATMENT OF NATURAL RUBBER PRODUCTS

(75) Inventors: Herman Feil, Ede (NL); Mark Domselaar, Wageningen (NL)

(73) Assignee: Budev B.V., Sint Michielsgestel (NL)

( * ) Notice: Subject to any disclaimer, the term of this patent is extended or adjusted under 35 U.S.C. 154(b) by 162 days.

(21) Appl. No.: 13/061,839

(22) PCT Filed: Sep. 3, 2009

(86) PCT No.: PCT/NL2009/050528
§ 371 (c)(1),
(2), (4) Date: Mar. 2, 2011

(87) PCT Pub. No.: WO2010/027261
PCT Pub. Date: Mar. 11, 2010

(65) Prior Publication Data
US 2011/0162676 A1     Jul. 7, 2011

(30) Foreign Application Priority Data
Sep. 5, 2008   (NL) ..................................... 1035901

(51) Int. Cl.
*C08C 1/04*   (2006.01)
(52) U.S. Cl.
USPC ............... 528/489; 134/19; 134/26; 528/488; 528/932

(58) Field of Classification Search
USPC ............... 134/29, 30, 42; 528/488, 489, 491, 528/932
See application file for complete search history.

(56) References Cited

U.S. PATENT DOCUMENTS

| 5,910,567 | A | * | 6/1999 | Tanaka et al. ................. 528/491 |
| 6,107,455 | A | | 8/2000 | Rosholm et al. |
| 2002/0091232 | A1 | | 7/2002 | Ichikawa et al. |
| 2002/0103333 | A1 | | 8/2002 | Honeycutt |

FOREIGN PATENT DOCUMENTS

| DE | 4406584 A1 | 9/1995 |
| GB | 305531 A | 3/1930 |
| GB | 2366509 A | 3/2002 |
| JP | 9071604 A | 3/1997 |
| JP | 2000109596 A | 4/2000 |
| JP | 200181107 A | 3/2001 |
| JP | 200320301 A | 1/2003 |

* cited by examiner

*Primary Examiner* — Michael Kornakov
*Assistant Examiner* — Caitlin N Dunlap
(74) *Attorney, Agent, or Firm* — The Webb Law Firm

(57) ABSTRACT

The present invention relates to a method of reducing allergenicity of natural rubber latex products caused by allergens by reducing extractable protein levels found for said products, said method comprising the steps of: subjecting said products to a wash in a strong alkaline solution to deteriorate the allergens, and a system for reducing allergenicity of natural rubber latex products caused by allergens by reducing extractable protein levels found for said products, and a product, such as a glover or condom, manufactured from natural rubber latex.

17 Claims, No Drawings

METHOD FOR TREATMENT OF NATURAL RUBBER PRODUCTS

TECHNICAL FIELD OF THE INVENTION

Natural Rubber Latex (herein also referred to as NRL) is being used for many products in for instance the health care industry, such as surgical gloves, and for manufacturing prophylactics, such as condoms.

Due to the stretchability, the natural feeling touch, its barrier properties including puncture resistance and even some self seallability after a puncture, Natural Rubber Latex is the preferred material for examination and surgical gloves. The latex sap harvested from the *Hevea Brasiliensis* tree contains proteins, which are functional for the stability of the latex suspension used in production of such products, for instance by dipping and/or molding. However, such proteins give rise to allergic reactions to sensitive people coming into physical contact with products made of this natural material.

BACKGROUND OF THE INVENTION

This allergic sensitivity of specific persons to the material has become a major problem in the health care industry and solutions are needed to prevent health care institutes from switching to inferior synthetic alternatives.

Some solutions have been proposed which denature the allergens. These methods mostly use added stabilizers to keep the rubber particles of the NRL from clogging. This changes the surface properties of the suspended rubber particles, resulting in different mechanical properties of the material. Other methods include washing finished latex products in aqueous solutions to remove surface proteins. None of the existing methods is able to completely prevent allergens to leach from latex products when they are immersed in water: all methods show detectable amounts of leachable allergens.

This invention thus relates to products made of natural rubber latex (NRL) that come into contact with humans and especially to NRL that exhibits no detectable amount of leachable allergens (and therefore or at least strongly reduced allergenicity potential) without the loss of physical properties or the introduction of new components altering the NRL formulation.

Solutions have been found in denaturing the allergens in the natural rubber latex suspension using proteases, strong oxidatives and bases. One of the major drawbacks of denaturing the proteins and allergens in the latex suspension is that the stabilizing function of these proteins is lost with it as well. This problem can be solved by adding stabilizers, but these will be present in the product after drying affecting the physical and mechanical properties of the NRL product. This invention therefore focuses on treatment of the NRL product after its production process.

The use of proteases in the latex suspension (JP9071604, JP2003020301, JP2001081107, JP2000109596, US20020091232) results in a lowered allergen content. However, a problem with these prior art solutions is, that these do not provide a sufficient solution to the problem of preventing allergic reactions in sensitized people that come into physical contact with NRL. Another disadvantage is that proteases themselves are known to be a source of allergic reactions, so care must be taken to completely remove the proteases from the final product and care should be taken while working with these proteases.

The oxidative washes (US20020103333, U.S. Pat. No. 5,910,567) generally use a strong chlorine or hypochlorite wash, which is able to reduce the leaching of allergens from NRL upon contact with water. However, in case the oxidator concentration is too strong, the NRL is affected by this wash, resulting in diminished gripping, elastomeric and tactile properties. In general the product becomes stiff, exhibiting hysteresis and requiring a heavy load to stretch. In case of a glove, the result is a poor fit and fatigue during use. These problems can be countered by using an additive to the NRL formulation that opposes these effects (US2002103333), but the material and its mechanical properties are still different from regular NRL. No cases have been reported where the NRL itself is not affected in a negative way by an oxidative wash (by choosing mild oxidation conditions) and wherein no detectable amounts of leachable allergens are found to remain after such a known treatment. The leachable allergen levels are in these prior art documents lowered, but still remain to be detectable.

The use of chemical proteolysis (DE4406584) by increasing the pH in the latex suspension is another option to remove the allergenicity. Experiments using this treatment resulted in products with inferior mechanical properties and poor processability into NRL products. Drying of the product took longer and the product could easily be torn apart by stretching.

It is acknowledged that some proposed procedures apply the use of an alkaline wash to remove proteins (JP9071604, JP2003020301, US20020103333). The focus of this wash is actually only to remove or modify the structure of the protein, and not to destroy the primary structure of the proteins. The conditions used for these washing steps are considered too mild to be considered an embodiment of chemically proteolysing the peptide bonds of the proteins. Moreover, in all these prior art disclosures, no decrease to undetectable amounts of leachable allergens is known to have been reported.

Further it is noted here that the state of the art, as acknowledged herein, comprises the disclosures of U.S. Pat No. 5,910,567; and GB-2.366.509. These disclosures all relate to treatment of natural rubber latex products to reduce allergenicity thereof. For instance according to U.S. Pat. No. 5,910,567 an alkaline solution at temperatures between room temperature (20° C.) and below 98° C. is used to wash NLR products to reduce allergenicity thereof. In GB-2.366.509 also NLR products are washed in an alkaline solution, after having been powdered with cornstarch and immersed in water heated to a temperature between 80° C. and 98° C. and removed from the water. After the hot water wash, according to this disclosure, the NLR products are subjected to the alkaline solution at an undisclosed temperature.

Thus the prior art teachings lead the skilled person to the belief that with the temperatures according to the prior art teachings a sufficient result, if not the best possible result, was obtained. Notwithstanding the fact, that many possible solutions have hitherto been presented, and the belief of the skilled artisan of already having available the optimal technology, no fully satisfactory solution has been made available in the relevant technical field to more substantially reduce the allergen levels, preferable to practically undetectable levels (at least: undetectable with currently available and commonly employed testing methods), while maintaining the desired properties of the NRL products.

SUMMARY OF THE INVENTION

The present invention is directed at decreasing the problems of the prior art method. More in particular, a solution is presented with which it is possible to reduce the extractable amount of allergens to extraordinarily low and even undetectable levels, according to the most modern and sensitive analyses methods. Thus, according to the invention it has become possible to achieve results which have never been reached before, at least not without affecting the physical properties of the Natural Rubber Latex matrix.

According to the present invention, as a solution to the problems of the prior art mentioned above, chemical proteolysis is applied to the NRL product after the production process. Due to the fact that no formulation changes are introduced of the NRL suspension, the processability is being maintained while the products physical and mechanical properties are not being altered. This method is capable of removing extractable protein of the NRL product to undetectable levels, by just adding or altering one washing step in the production process to remove the protein by chemical proteolysis.

According to the present invention the conditions considered necessary are applied to not only wash away the proteins but actually destroy the allergens by breaking the peptide bonds of the proteins by chemical proteolysis.

The presented method is mainly based on chemical proteolysis of the proteins at the surface of a product made of Natural Rubber Latex. This proteolysis occurs by washing the product in a strong alkaline solution (e.g. pH>10) at elevated temperatures above 100° C. Higher temperatures above 100° C. in particular have been surprisingly found to improve and evidently also speed up the proteolysis, without affecting or even deteriorating the NRL products, all far beyond the normal expectation of the skilled person, which amongst other effects also allows for shorter contact times. In these conditions peptide bonds will be subject to nucleofillic attacks by nucleofiles like OH— (stronger nucleofiles may also be applied), breaking the peptide bond of the proteins through a nucleofillic substitution reaction. The amide group of the protein bond will act as the leaving group and the remaining carboxyl group will be deprotonized due to the high pH, leaving a stabilized carboxylate group which cannot be subject to a nucleofillic attack again.

The needed level of proteolysis is achieved by washing the NRL product using an alkaline solution at elevated temperatures above 100° C. Washing using alkaline solution at room temperature, or washing using elevated temperatures and a neutral pH, does not reduce extractable protein levels more than 99%, even at long contact times (e.g. 1 day). Washing at 118° C. and pH 14, for example during 1 hour and preferably under pressure (e.g. 2 atm.) to keep the solution from boiling/evaporating, reduces extractable protein levels to undetectable levels, while deterioration of the material is fully prevented.

When looking at the actual allergen concentration of a NRL product, washing at pH 14 and 118° C. for 1 hour, preferably under sufficient pressure to keep the alkaline solution in a fluid phase, removes all allergens to levels which are below the current detection limits of the QuattroMed FitKit allergens testing kit (<0.15 μg/g for the four main allergens of NRL: <0.050 μg/g for Hevb1, <0.050 μg/g for Hevb3, <0.025 μg/g for Hevb5 and <0.025 μg/g for Hevb6.02). It is noted here for comparison, that washing at room temperature (18-20° C.) in a high-pH solution enables a reduction of the allergen concentration from 30 μg/g to 1 μg/g, but it is clear that this does not suffice.

Thus according to the invention as defined in the appended claims, in particular the independent claims, a new washing procedure has been developed for natural rubber latex products. A washing process (on an aqueous basis) according to the present invention was tested on medical gloves. At testing, for both powdered and non-powdered gloves, an elimination in allergen leaching from the gloves after the treatment was noticeably detected. More accurately it is noted, that the quantities of the four mayor NRL allergens were all below the detection limit of the FITkit method, as performed by and/or in accordance with guidelines from the company Quattromed in Estland.

The washing process has been investigated with respect to the material properties of the resulting NRL products, and appears not to affect the mechanical properties, and is considered to be technically and economically feasible on a large scale production level.

The table below shows results using commonly used gloves from arbitrary producers.

| Sample | Total protein leaching (ug/g), measured with a total protein essay[1] | Leaching of 4 allergens (ug/g), determined by Quattromed's FITkit measuring method |
| --- | --- | --- |
| glove ex dipping machine | 52 (+/−2.0) | Total: 7.81 (Heb b1: undetectable, Hev b3: 0.07, Hev b5: 2.97, Hev b 6.02: 4.77) |
| glove chlorinated | 4.5 (+/−1.0) | Results not determined |
| glove ex dipping machine washed using the present new method | 0.0 (+/−1.0) | Total: undetectable (detection limit: 0.15 ug/g) All 4 allergens: undetectable |
| glove Chlorinated washed using the present new method | 0.0 (+/−1.0) | Total: undetectable (detection limit: 0.15 ug/g) All 4 allergens: undetectable |

[1]Measurement performed after 1 hour of extraction in PBS, pH = 7.25, room temperature.

It was found that, for both types of gloves, the current new washing process reduced the allergen leaching to zero, or at least a level undetectable with current and presently common testing methods, as determined by a total protein essay (detection limit approx. 1 ug/g), and by the FITkit method (detection limit of sum of 4 allergens: 0.15ug/g).

The gloves treated in accordance with the new method of the present invention were further also tested to determine the Stress-strain curves of these treated gloves. This did not show any changes in mechanical properties of the gloves, which could have resulted from the new method according to the present invention. In particular it is noted, that boiling/evaporation of the alkaline solution at an elevated temperature of 100° C. or more for washing the products therein, could have had an adverse effect on the NLR material itself, as well as the colour and the mechanical properties thereof. Salty alkalines could then be freed to affect the NLR material, rather than to clean the NLR products from the allergens therein or -on. This, and similar considerations with respect to gasses freed upon boiling of the solution, refrained the skilled person in the past from attempting to raise the temperature to the levels according to the present invention.

Pressurization provides a possible means for keeping the solution from boiling and thus prevent damage to the product material from exposure to gas and freed salty alkalines, which occur at boiling of the alkaline solution. Possibly for this pressurization a pressure tank or vessel may be employed, but alternatives are readily available to the skilled person. As an alternative for pressurization, the skilled person may contemplate adding an additive to the alkaline solution, for raising the boiling point thereof and/or keep salty alkalines from being freed at the elevated temperatures, to prevent the material from being affected during the treatment thereof.

It is noted that the skilled person according to the state of the art disclosures had no incentive to attempt elevated temperatures to above 100° C. in combination with either of an elevated pressure and boiling point raising additives. In stead it is strongly suspected that the skilled person, having the pressure free preceding production steps of dipping or molding in mind, would have had a prejudice against either of raising the temperature to above 100 degrees C. and applying pressure on a newly produced NLR product during a cleaning treatment for fear of damage to the product.

It has become apparent, that subsequent storage does not affect the mechanical properties either, since in another test gloves (no brand) were treated and stored for 6 months. These gloves did not either exhibit any significant changes in the tested stress-strain curve, which could have occurred during storage.

Thus, the obtained results are unique and very promising. Moreover, the method is considered to be applicable and affordable in practice. The new method of the present invention can be upscaled and made suitable for the current large scale production practice without undue burden. Several different options are considered to be applicable for the new method of the invention: the method can be used as an additional step, or replace existing steps (e.g. the chlorination). Further, the new method is anticipated to result in beneficial economic effects, which may positively affect cost price, and may lead to lower prices, if the method can be used to replace a more expensive step in the production.

DETAILED DESCRIPTION OF PREFERRED EMBODIMENTS

Below a number of not-limiting examples of embodiments of the invention are described.

Example 1

In a first comparative example of the state of the art NRL products are washed in a strong alkaline suspension. The products have been previously manufactured by dipping a mold into a NRL suspension. After manufacture, the product is washed in a strong alkaline solution. The alkaline solution had a pH of 10. The temperature of the solution is elevated to approximately 30 degrees. The product is washed in the solution for 10 minutes and already an improvement is then detectable.

Example 2

In a second comparative example NRL products are washed in a strong alkaline suspension. The products have been previously manufactured by molding a NRL suspension, where the suspension is injected or otherwise introduced into a mold. After manufacture, the product is washed in a strong alkaline solution. The alkaline solution has a pH of 10. The temperature of the solution is elevated, before or even during washing, to approximately 30 degrees. The product is washed in the solution for 10 minutes and already an improvement is detectable.

Example 3

In another comparative example, the method is the same as either of examples 1 and 2, with as a difference that the time of washing is increased to 1 hour, where a further increase in the effectiveness was detectable.

Example 4

In this comparative example the washing time is increased one day, and all other features remain unchanged relative to example 3. Again a further increase in the effectiveness is made detectable.

Example 5

In this comparative example, the method is the same as any one of the examples 1, 2, 3 and 4, with as a difference that the strength of the alkaline solution is increased to a pH of 14, where a further increase in the effectiveness is detectable.

Example 6

In this comparative example, all features of examples 1-5 are unaltered, except that the temperature is raised to 50° C.

Example 7

In this comparative example, all features of examples 1-5 is unaltered, except that the temperature is raised to 70° C.

Example 8

In this first embodiment of the invention according to this example, all features of examples 1-5 are unaltered, except that the temperature is raised to above 100° C.

Example 9

In the second embodiment of the invention according to this example, all features of examples 1-5 are unaltered, except that the temperature is raised to 110° C.

Example 10

In the third embodiment of the invention, all features of examples 1-5 are unaltered, except that the temperature is raised to approximately 118° C.

Example 11

In this fourth embodiment of the invention, the features of any one of the examples 6-10 are the same, with the exception that a pressure vessel, such as an autoclave, is used to contain the strong alkaline solution (pH=10 or 14, with one of NaOH and KOH having a concentration of at least 0.01 M). In the vessel pressure is increased to keep the solution in fluid phase and prevent evaporation. The pressure in the vessel is, during treatment of the products, raised to more than one atm. ($1.013*10^5$ Pa). The pressure level was selected to keep evaporation and/or freeing salty alkalines from occurring; for instance at more than 1 atm. at a temperature of 100° C., more than 1.5 atm. at 110° C. and more than 2.0 atm. at 120° C.

Example 12

The features are in this example the same as in the previous example, except the concentration of NaOH and/or KOH could also be taken as high as 1 M.

Example 13

In addition to or instead of NaOH or KOH other nucleofillic substances can be used, such as H2O, OH, CH3-CH2-O—, I— and CN—.

Example 14

The features in this example are the same as in any one of the preceding examples. Additionally, in a step surfactants in a solution are provided and the product is washed or submerged in this solution. Such a surfactant may comprise or be SDS (sodium dodecyl sulfate).

Example 15

In addition to the steps in any one of the preceding examples, a protease treatment is employed, where a solution comprising enzymes is provided for the products to be washed or submerged in.

Example 16

In addition to the steps in any one of the preceding examples, the products are subjected to an oxidative treatment, wherein for instance a chlorine solution is provided for the products to be washed or at least submerged in the solution.

Example 17

As a consequence of the extra-ordinary results of the method according to the present invention, it has again become possible to use a talcum or similar type powdering for the products. In the past, powdering the products, such as surgical gloves, with a talcum or starch powdering has become less and less usual, since the powders used were found to provide a basis for allergens to attach to. To date powdered gloves are still being produced and sold, but less and less so, precisely because of the attachment of allergens to the powders used. Now that no or at least far less allergens remain on the products after subjecting the products to the method according to the present invention, powdering may yet again become desirable in view of the improved ease of handling. For instance, a powdered glove is far easier arranged on a user's hand than a product without powdering. As a consequence it is believed that powdering can provide a further improved result of the method in as far as the resulting product is concerned.

In overview, a global summary of results of one of many series of tests, where these tests were performed at pH=14, is as follows:

| Temp (° C.) | Press (atm.) | Allergenicity measurement (ug/g with a sd of 1 ug/g) | Mechanical weakening | Discoloration |
|---|---|---|---|---|
| 30 | 1 | 7.2 | N | N |
|  | 2 | 7.2 | N | N |
| 60 | 1 | 5.2 | N | N |
|  | 2 | 5.2 | N | N |
| 90 | 1 | 2.4 | N | N |
|  | 2 | 2.4 | N | N |
| 100 | 1 | 0.9 | N | N |

-continued

| Temp (° C.) | Press (atm.) | Allergenicity measurement (ug/g with a sd of 1 ug/g) | Mechanical weakening | Discoloration |
|---|---|---|---|---|
|  | 2 | 0.9 | N | N |
| 110[1] | 1 | NA | WEAKENED | DISCOLOURED |
|  | 2 | 0.0 | N | N |
| 118[1] | 1 | NA | WEAKENED | DISCOLOURED |
|  | 2 | 0.0 | N | N |

NOTE
[1]The solution never reached these temperatures, for the temperature of the water in the solution cannot be increased to above 100 degrees C., when at atmospheric pressure.

Based on the above results the improvement of as a result of the present invention over the prior art has become abundantly clear. After the preceding disclosure of the present invention, many additional and alternative embodiments will have become apparent to the skilled person, which are all considered to lie within the grasp of the skilled person on the basis of his common general knowledge and within the scope of protection for the present invention as defined in the appended claims, unless such further embodiments depart substantially in sprit or definition from these appended claims. For instance the skilled person could and would contemplate other temperatures, specifically higher temperatures than those specifically mentioned above. Also the step of powdering is not essential. However, a powdered product with hardly any or practically undetectable amounts of leachable allergens will provide a strong indication of an embodiment of the invention as a consequence of the otherwise (without a method according to the invention) generally very high allergen content of such products and the present day common practice—prior to the present invention—of refraining, by many producers and users from powdering the products and using such powdered products. Also, many examples have been provided, and it is emphasized here that all combinations of distinctly presented embodiments are also within the scope of the invention.

The invention claimed is:

1. A method of reducing allergenicity of natural rubber latex (NRL) products caused by allergens by reducing extractable protein levels found in said products, said method comprising the steps of:
    subjecting said products to a wash in an alkaline solution to deteriorate the allergens, said wash comprising raising the temperature of the alkaline solution to higher than 100° C., pressurizing the alkaline solution to at least 1.5 atm, and keeping the alkaline solution in a fluid phase without evaporation or boiling and/or freeing salty alkalines.

2. The method of claim 1, comprising: raising the temperature of the alkaline solution to 110° C. or higher.

3. The method of claim 1, further comprising: pressurizing the alkaline solution to prevent evaporation of at least water in the alkaline solution.

4. The method of claim 1, further comprising adding an additive to the alkaline solution to raise the boiling point of the alkaline solution and/or to prevent freeing salty alkalines.

5. The method of claim 1, wherein said alkaline solution has a pH of 10 or more.

6. The method of claim 5, wherein said alkaline solution has a pH of 14.

7. The method of claim 1, wherein said alkaline solution is a solution of NaOH or KOH in a concentration of 0.01M or higher.

8. The method of claim 1, wherein the extractable protein content of the product is lowered at room temperature to concentrations lower than 10 μg/g.

9. The method of claim 1, wherein said alkaline solution comprises at least one nucleofile from the group consisting of $H_2O$, OH, $CH_3$—$CH_2$—O—, I— and CN—.

10. The method of claim 1, wherein the step of subjecting said products to a wash in an alkaline solution is maintained for at least five minutes.

11. The method of claim 1, wherein said alkaline solution is supplemented with surfactants to aid the wetting and improve the nucleofillic substitution reaction.

12. The method of claim 1, wherein said alkaline solution is supplemented with active chlorine to further remove proteins from NRL products.

13. The method of claim 1, forming a step in a process of manufacturing said NRL product, where said manufacture of the NRL product comprises at least one step selected from the group consisting of molding the product from a natural rubber suspension, dipping a mold into a natural rubber latex suspension, and vulcanization of the natural rubber latex product.

14. The method of claim 1, further comprising as an additional step a protease treatment to reduce the allergenicity of the product.

15. The method of claim 1, further comprising as an additional step an oxidative treatment to reduce the allergenicity of the product.

16. The method of claim 1, further comprising powdering the product with talcum powder or starch.

17. The method of claim 1, wherein said alkaline solution is a solution of NaOH or KOH in a concentration of 1M.

* * * * *